United States Patent [19]

Nalesnik et al.

[11] Patent Number: 5,238,588
[45] Date of Patent: Aug. 24, 1993

[54] DISPERSANT, VI IMPROVER, ADDITIVE AND LUBRICATING OIL COMPOSITION CONTAINING SAME

[75] Inventors: Theodore E. Nalesnik, Wappingers Falls; Benjamin J. Kaufman, Hopewell Junction, both of N.Y.; James G. Dadura, Houston, Tex.

[73] Assignee: Texaco Inc., White Plains, N.Y.

[21] Appl. No.: 397,944

[22] Filed: Aug. 24, 1989

[51] Int. Cl.$^5$ .......................................... C10M 149/10
[52] U.S. Cl. ........................ 252/51.5 A; 252/51.5 R; 525/326.7; 525/331.7; 525/375
[58] Field of Search .............. 252/51.5 R, 51.5 A; 525/326.7, 331.7, 375

[56] References Cited

U.S. PATENT DOCUMENTS

| | | | |
|---|---|---|---|
| 3,884,822 | 5/1975 | Gemmill | 252/51.5 A |
| 4,137,185 | 1/1979 | Gardiner | 252/33 |
| 4,146,489 | 3/1979 | Stambaugh | 252/51.5 A X |
| 4,234,435 | 11/1980 | Meinhardt et al. | 252/47.5 |
| 4,320,019 | 3/1982 | Hayashi | 252/51.5 A |
| 4,382,007 | 5/1983 | Chafetz | 252/51.5 A |
| 4,735,736 | 4/1988 | Chung | 252/51.5 A |

*Primary Examiner*—Ellen M. McAvoy
*Attorney, Agent, or Firm*—Robert B. Burns; James J. O'Loughlin

[57] ABSTRACT

An additive composition comprising a graft and aminoheteroaromatic derivatized copolymer prepared from ethylene and at least one $C_3$–$C_{10}$ alpha-monoolefin and, optionally, a comprising from about 15 to 80 mole percent of ethylene, from about 20 to 85 mole percent of said $C_3$–$C_{10}$ alpha-monoolefin and from about 0 to 15 mole percent of said polyene having a number average molecular weight ranging from about 5000 to 500,000 which has been reacted with at least one olefinic carboxylic acid acylating agent to form one or more acylating reaction intermediates characterized by having a carboxylic acid acylating function within their structure and reacting said reaction intermediate with an aminoheteroaromatic compound and a lubricating oil composition containing same are provided.

17 Claims, No Drawings

DISPERSANT, VI IMPROVER, ADDITIVE AND LUBRICATING OIL COMPOSITION CONTAINING SAME

BACKGROUND OF THE INVENTION

This invention relates to a novel multi-functional lubricant additive which is a VI improver and a dispersant additive when employed in a lubricating oil composition.

DISCLOSURE STATEMENT

The art is replete with disclosures on the use of polymer additives in lubricating oil compositions. Ethylene-propylene copolymers and ethylene-alpha olefin non-conjugated diene terpolymers which have been further derivatized to provide bifunctional properties in lubricating oil compositions illustrate this type of oil additive.

U.S. Pat. No. 3,522,180 discloses a method for the preparation of an ethylene-propylene copolymer substrate effective as a viscosity index improver for lubricating oils.

U.S. Pat. No. 4,026,809 discloses graph copolymers of a methacrylate ester and an ethylene-propylene-alkylidene norbornene terpolymer as a viscosity index improver for lubricating oils.

U.S. Pat. No. 4,089,794 discloses ethylene copolymers derived from ethylene and one or more $C_3$ to $C_{28}$ alpha olefin solution grafted with an ethylenically-unsaturated carboxylic acid material followed by a reaction with a polyfunctional material reactive with carboxyl groups, such as a polyamine, a polyol, or a hydroxyamine which reaction product is useful as a sludge and varnish control additive in lubricating oils.

U.S. Pat. No. 4,137,185 discloses a stabilized imide graft of an ethylene copolymer additive for lubricants.

U.S. Pat. No. 4,146,489 discloses a graph copolymer where the backbone polymer is an oil-soluble ethylene-propylene copolymer or an ethylene-propylene-diene modified terpolymer with a graph monomer of C-vinyl-pyridine or N-vinylpyrrolidone to provide a dispersant VI improver for lubricating oils.

U.S. Pat. No. 4,320,019 discloses a multipurpose lubricating additive prepared by the reaction of an interpolymer of ethylene and a $C_3$–$C_8$ alpha-monoolefin with an olefinic carboxylic acid acylating agent to form an acylating reaction intermediate which is then reacted with an amine.

U.S. Pat. No. 4,340,689 discloses a process for grafting a functional organic group onto an ethylene copolymer or an ethylene-propylene-diene terpolymer.

U.S. Pat. No. 4,357,250 discloses a reaction product of a copolymer and an olefin carboxylic acid via the "ene" reaction followed by a reaction with a monoamine-polyamine mixture.

U.S. Pat. No. 4,382,007 discloses a dispersant—VI improver prepared by reacting a polyamine-derived dispersant with an oxidized ethylene-propylene polymer or an ethylene-propylene diene terpolymer.

U.S. Pat. No. 4,144,181 discloses polymer additives for fuels and lubricants comprising a grafted ethylene copolymer reacted with a polyamine, polyol or hydroxyamine and finally reacted with a alkaryl sulfonic acid.

U.S. Pat. No. 4,735,736 discloses grafted hydrocarbon polymers followed by a reaction with a polyamine and treatment and/or reaction with a manoamine.

U.S. Pat. No. 4,780,228 discloses the grafting of a hydrocarbon polymer in the absence of a solvent in the presence of a free radical initiator and a claim-stopping agent followed by a reaction with an amine, polyol or an aminoalcohol.

The disclosures in the forgoing patents which relate to VI improvers and dispersants for lubricating oils, namely U.S. Pat. Nos. 3,522,180, 4,026,809, 4,089,794, 4,137,185 4,144,181, - 4,146,489, 4,320,019, 4,340,689, 4,357,250, 4,382,007 4,735,736 and 4,780,228 are incorporated herein by reference.

An object of this invention is to provide a novel derivatized graft copolymer composition.

Another object of the invention is to provide a multi-functional lubricant additive effective for imparting viscosity index, and dispersancy properties to a lubricating oil composition.

A further object is to provide a novel lubricating oil composition containing the graft copolymer additive of the invention as well as to provide concentrates of the novel additive of invention.

SUMMARY OF THE INVENTION

The novel reaction product of the invention comprises an ethylene copolymer or terpolymer of a $C_3$ to $C_{10}$ alpha-monoolefin and optionally a non-conjugated diene or triene on which has been grafted an ethylenically unsaturated carboxylic function which is then further derivatized with an aminoheteroaromatic compound selected from the group consisting of aminopyridines, aminopyrazines and aminopyrimidines represented by the following formulas:

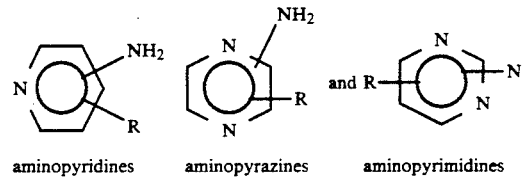

aminopyridines   aminopyrazines   aminopyrimidines in which R represents hydrogen or an alkyl or alkoxyl radical having from 1 to 18 carbon atoms.

The novel lubricant of the invention comprises an oil of lubricating viscosity and an effective amount of the novel reaction product. The lubricating oil will be characterized by having viscosity index improver and dispersancy, properties.

Concentrates of the reaction product of the invention are also contemplated.

DETAILED DESCRIPTION OF THE INVENTION

The polymer or copolymer substrate employed in the novel additive of the invention may be prepared from ethylene and propylene or it may be prepared from ethylene and a higher olefin within the range of $C_3$ to $C_{10}$ alpha-monoolefins.

More complex polymer substrates, often designated as interpolymers, may be prepared using a third component. The third component generally used to prepare an interpolymer substrate is a polyene monomer selected from non-conjugated dienes and trienes. The non-conjugated diene component is one having from 5 to 14 carbon atoms in the chain. Preferably, the diene monomer is characterized by the presence of a vinyl group in its structure and can include cyclic and bi-cyclo compounds. Representative dienes include 1,4-hexadiene, 1,4-cyclohexadiene, dicyclopentadiene, 5-ethylidene-2-norbornene, 5-methylene-2-norborene, 1,5-heptadiene, and 1,6-octadiene. A mixture of more than one diene can be used in the preparation of the interpolymer. A preferred non-conjugated diene for preparing a terpolymer or interpolymer substrate is 1,4-hexadiene.

The triene component will have at least two non-conjugated double bonds, and up to about 30 carbon atoms in the chain. Typical trienes useful in preparing the interpolymer of the invention are 1-isopropylidene-3a,4,7,7a-tetrahydroindene, 1-isopropylidenedicyclopentadiene, dehydro-isodicyclopentadiene, and 2-(2-methylene-4-methyl-3-pentenyl)-[2.2.1] bicyclo-5-heptene.

The polymerization reaction to form the polymer substrate is generally carried out in the presence of a catalyst in a solvent medium. The polymerization solvent may be any suitable inert organic solvent that is liquid under reaction conditions for solution polymerization of monoolefins which is generally conducted in the presence of a Ziegler type catalyst. Examples of satisfactory hydrocarbon solvents include straight chain paraffins having from 5-8 carbon atoms, with hexane being preferred. Aromatic hydrocarbons, preferably aromatic hydrocarbon having a single benzene nucleus, such as benzene, toluene and the like; and saturated cyclic hydrocarbons having boiling point ranges approximating those of the straight chain paraffinic hydrocarbons and aromatic hydrocarbons described above, are particularly suitable. The solvent selected may be a mixture of one or more of the foregoing hydrocarbons. It is desirable that the solvent be free of substances that will interfere with a Ziegler polymerization reaction.

In a typical preparation of a polymer substrate, hexane is first introduced into a reactor and the temperature in the reactor is raised moderately to about 30° C. Dry propylene is fed to the reactor until the pressure reaches about 40-45 inches of mercury. The pressure is then increased to about 60 inches of mercury and dry ethylene and 5-ethylidene-2-norbornene are fed to the reactor. The monomer feeds are stopped and a mixture of aluminum sesquichloride and vanadium oxytrichloride are added to initiate the polymerization reaction. Completion of the polymerization reaction is evidenced by a drop in the pressure in the reactor.

Ethylene-propylene or higher alpha monoolefin copolymers may consist of from about 15 to 80 mole percent ethylene and from about 20 to 85 mole percent propylene or higher monoolefin with the preferred mole ratios being from about 25 to 75 mole percent ethylene and from about 25 to 75 mole percent of a $C_3$ to $C_{10}$ alpha monoolefin with the most preferred proportions being from 25 to 55 mole percent ethylene and 45 to 75 mole percent propylene. The polymer substrate may comprise a polymer prepared from ethylene and at least one $C_3$-$C_{10}$ alpha-monoolefin and optionally a polyene selected from non-conjugated dienes and trienes comprising from about 15 to 80 mole percent of ethylene, from about 20 to 85 mole percent of said $C_3$-$C_{10}$ alpha-monoolefin and from about 0 to 15 mole percent of said polyene and having a number average molecular weight ranging from about 5,000 to 500,000 with at least one olefinic carboxylic acid acylating agent to form one or more acylating reaction intermediates characterized by having a carboxylic acid acylating function within their structure.

Terpolymer variations of the foregoing polymers may contain from about 0.1 to 10 mole percent of a non-conjugated diene or triene.

The polymer substrate, that is the ethylene copolymer or terpolymer is an oil-soluble, substantially linear, rubbery material having a number average molecular weight from about 5,000 to 500,000 with a preferred number average molecular weight range of 25,000 to 250,000 and a most preferred range from about 50,000 to 150,000.

The terms polymer and copolymer are used generically to encompass ethylene copolymers, terpolymers or interpolymers. These materials may contain minor amounts of other olefinic monomers so long as their basic characteristics are not materially changed.

An ethylenically unsaturated carboxylic acid material is next grafted onto the prescribed polymer backbone. These materials which are attached to the polymer contain at least one ethylenic bond and at least one, preferably two, carboxylic acid or its anhydride groups or a polar group which is convertible into said carboxyl groups by oxidation or hydrolysis. Maleic anhydride or a derivative thereof is preferred. It grafts onto the ethylene copolymer or terpolymer to give two carboxylic acid functionalities. Examples of additional unsaturated carboxylic materials include chlormaleic anhydride, itaconic anhydride, or the corresponding dicarboxylic acids, such as maleic acid, fumaric acid and their monoesters.

The ethylenically unsaturated carboxylic acid material may be grafted onto the polymer backbone in a number of ways. It may be grafted onto the backbone by a thermal process known as the "ene" process or by grafting in solution form using a radical initiator. The free-radical induced grafting of ethylenically unsaturated carboxylic acid materials in solvents, such as benzene is a preferred method. It is carried out at an elevated temperature in the range of about 100° C. to 250° C., preferably 120° to 190° C. and more preferably at 150° to 180° C., e.g. above 160° C., in a solvent, preferably a mineral lubricating oil solution containing, e.g. 1 to 50, preferably 5 to 30 wt. %, based on the initial total oil solution, of the ethylene polymer and preferably under an inert environment.

The free-radical initiators which may be used are peroxides, hydroperoxides, and azo compounds and preferably those which have a boiling point greater than about 100° C. and decompose thermally within the grafting temperature range to provide free radicals. Representative of these free-radical initiators are azobutyronitrile and-2,5-dimethyl-hex-3-yne-2,5 bis-tertiary-butyl peroxide. The initiator is used in an amount of between about 0.005% and about 1% by weight based on the weight of the reaction mixture solution. The grafting is preferably carried out in an inert atmosphere, such as under nitrogen blanketing. The resulting polymer intermediate is characterized by having carboxylic acid acylating functions within its structure.

Polymer substrates or interpolymers are available commercially. Particularly useful are those containing from about 40 to about 60 mole percent ethylene units, about 60 to about 40 mole percent propylene units. Examples are "Ortholeum 2052" and "PL-1256" available from E. I. duPont deNemours and Co. The former is a terpolymer containing about 48 mole percent ethylene units, 48 mole percent propylene units and 4 mole percent, 1,4-hexadiene units, having an inherent viscosity of 1.35. The latter is a viscosity average molecular weights of the two are on the order of 200,000 and 280,000, respectively.

The polymer intermediate possessing carboxylic acid acylating functions is reacted with an aminoaromatic compound from the group consisting of aminopyridines, amino pyrazines, and amino pyrimidines represented by the formulas:

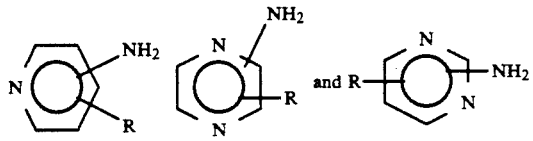

in which R represents hydrogen or an alkyl or alkoxyl radical having from 1 to 18 carbon atoms.

Examples of suitable aminopyridines include 2-aminopyridine, 4-aminopyridine 2-amino-4-methylpyridine, 2-(aminoethyl) pyridine, 2-(aminopropyl) pyridine, 4-(aminopropyl) pyridine, aminopyrazine and aminopyrimidine.

The reaction between the polymer substrate intermediate having grafted thereon carboxylic acid acylating function and the prescribed aminopyridine compound is conducted by heating a solution of the polymer substrate under inert conditions and then adding the aminopyridine to the heated solution generally with mixing to effect the reaction. It is convenient to employ an oil solution of the polymer substrate heated to 140° to 175° C. while maintaining the solution under a nitrogen blanket. The aminopyridine polyamine compound is added to this solution and the reaction is effected under the noted conditions.

The following examples illustrate the preparation of the novel reaction product additive of the invention.

EXAMPLE I 180 grams of a solid maleic anhydride graft polymer (MA-EPM-rubber) in which the polymer substrate consisted of about 60 mole percent ethylene and 40 mole percent propylene having a number average molecular weight of 80,000 on which has been grafted 1.0 weight percent of maleic anhydride was dissolved in 1320 grams of solvent neutral oil at 160° C. with mechanical stirring while the mixture was maintained under a nitrogen blanket. After the rubber polymer had dissolved, mixing was continued for an additional hour at 160° C. and then cooled.

The rubber-oil solution was transferred to a Parr reactor and heated to 160° C. under 200 psi of nitrogen. 1.82 grams of 2-aminopyridine dissolved in 20.0 grams of ethyoxylated alkyl phenol (Surfonic N-40) were injected into the oil solution with stirring. The reaction was continued for three hours at 160° C. and under a nitrogen blanket. The reaction product was cooled to 100° C. and filtered through a 100 mesh screen.

EXAMPLE II 72.0 grams of the solid maleic anhydride graft polymer of Example I were mixed in 528 grams of solvent neutral oil at 160° C. with stirring under a nitrogen blanket until dissolved. Stirring was continued for an additional hour under the same conditions. Solid 4-aminopyridine (0.80 grams) was added to the rubber-oil solution. The reaction was continued with stirring at 160° C. for three hours under a nitrogen blanket. The reaction mixture was cooled to 100° C. and filtered.

EXAMPLE III 72.0 grams of the solid maleic anhydride graft polymer of Example I were mixed in 528 grams of solvent neutral oil at 160° C. with stirring under a nitrogen blanket until dissolved. Stirring was continued for an additional hour under the same conditions. Aminopyrazine (0.80 grams) was then added to the rubber-oil solution. The reaction was continued with stirring at 160° C. for three hours under a nitrogen blanket. The reaction mixture was cooled to 100° C. and filtered.

EXAMPLE IV 72.0 grams of the solid maleic anhydride graft polymer of Example I were mixed in 528 grams of solvent neutral oil at 160° C. with stirring under a nitrogen blanket until dissolved. Stirring was continued for an additional hour under the same conditions. Aminopyrimidine (0.80 grams) was then added to the rubber-oil solution. The reaction was continued with stirring at 160° C. for three hours under a nitrogen blanket. The reaction mixture was cooled to 100° C. and filtered.

The novel graft and derivatized polymer of the invention is useful as an additive for lubricating oils. They are multi-functional additives for lubricants being effective to provide dispersancy, and viscosity index improvement properties to lubricating oils. They can be employed in a variety of oils of lubricating viscosity including natural and synthetic lubricating oils and mixtures thereof. The novel additives can be employed in crankcase lubricating oils for spark-ignited and compression-ignited internal combustion engines. The compositions can also be used in gas engines, or turbines, automatic transmission fluids, gear lubricants, metal-working lubricants, hydraulic fluids and other lubricating oil and grease compositions. Their use in motor fuel compositions is also contemplated.

The base oil may be a natural oil including liquid petroleum oils and solvent-treated or acid-treated mineral lubricating oils of the paraffinic, naphthenic and mixed paraffinic-naphthenic types.

In general, the lubricating oil composition of the invention will contain the novel reaction product in a concentration ranging from about 0.1 to 30 weight percent. A preferred concentration range for the additive is from about 1 to 15 weight percent based on the total weight of the oil composition.

Oil concentrates of the additives may contain from about 1 to 50 weight percent of the additive reaction product in a carrier or dilvent oil of lubricating oil viscosity.

The novel reaction product of the invention may be employed in lubricant compositions together with conventional lubricant additives. Such additives may include additional dispersants, detergents, anti-oxidants, pour point depressants, anti-wear agents and the like.

The novel additive reaction product of the invention was tested for its effectiveness as a dispersant in a formulated lubricating oil composition. In the examples, the polymer substrate employed was the MA-EPM-rubber comprising about 60 mole percent ethylene, 40 mole percent propylene having a number average molecular weight of about 80,000 and 1.0 weight percent of maleic anhydride. The base lubricating oil used in the dispersancy test was a typical formulated lubricating oil as represented by the values set forth in Table I.

TABLE I

| Component | Parts By Wgt. |
|---|---|
| Solvent neutral oil A | 75.25 |
| Solvent neutral oil B | 21.64 |
| Zinc Dialkyldithiophosphate | 1.22 |
| 4,4'dinonyldiphenylamine | .39 |
| Overbased magnesium sulfonate | 1.50 |
| Silicone antifoamant | 150 PPM |
| Product | 10 |
| Analyses | |
| Viscosity Kin 40C CS | 30.4 |
| Viscosity Kin 100C CS | 5.33 |
| Pour Point, F. | +10 |
| Ash Sulfated, % D874 | 0.88 |
| Phosphorus, % X-Ray | 0.12 |
| Sulfur, % X-Ray Total | 0.32 |
| Zinc, % X-Ray | 0.13 |

Oil A had a sp. gr. 60/60° F. of 0.858–0.868; Vis 100° F. 123-133; Pour Point 0° F. Oil B had a sp. gr. 60/60/°F. of 0.871–0.887; Vis. 100° F. 325-350; Pour Point +10° F. Zinc salt is a salt of mixed alcohols-ispropanol and $P_2S_5$ product as described in U.S. Pat. No. 3,292,181. The overbased magnesium sulfonate had a TBN of 395 and is a salt of branched $C_{20}$-$C_{40}$ monoalkybenzene sulfuric acid (MW 530-540) together with about 10% magnesium carbonate, 14% magnesium hydroxide and 4% magnesium sulfate.

The dispersant properties of the additive-containing oil are determined in the Bench VC Dispersancy Test (BVCT). Dispersancy of a lubricating oil is determined relative to three references which are the results from three standard blends tested along with the unknown. The test additives were blended into a formulated oil containing no dispersant. The additive reaction product was employed in the oil at a concentration of 12.0 weight percent polymer solution.

The product prepared in examples 1 and 2 were blended into formulated oils not containing a dispersant to form 1.20 wt % polymer solutions. These blends were tested for dispersancy in the Bench VC Test (Table II). In this test dispersancy is compared to that of three reference oils (which are tested along with the experimental samples. The numerical value of a test result decreases with an increase of dispersant effectiveness.

TABLE II

| VI Improver Performance | |
|---|---|
| VI Improver | BVCT[1] |
| Example 1 | 51 |
| Example 2 | 77 |
| Example 3 | 38 |
| Example 4 | 78 |
| EPM | 99 |
| MA-EPM (underivatized) | 88 |
| Commercial NVP grafted DOCP | 68 |
| The EPM base rubber and mol. wt. avg. are similar in all examples in Table II. | |

[1] The lower the value the better the performance.

The results from the BVCT Test show that the dispersant VI improver prepared in Examples 1, 2, 3 and 4 gave better dispersancy performance than the corresponding EPM (without the aminoaromatic compound derivative) and equivalent performance to a commercial NVP grafted DOCP VI Improver. The engine test used to evaluate gasoline engine cleanliness, or the ability of an oil formulation to prevent sludge and piston deposits, is the Sequence VE engine test. To evaluate the dispersancy performance of Example 1 DOCP, this DOCP was blended in a 5W-30 SF motor oil formulation and evaluated in the Sequence VE engine test against a commercial DOCP. As seen in Table III, Example 1 DOCP demonstrates better performance in both sludge and varnish control as compared to the commercial DOCP.

TABLE III

| Sequence VE Engine Test | | | |
|---|---|---|---|
| VI Improver [1] Sequence VE | Example 1 | Commercial DOCP | SG Limits |
| Avg. Sludge | 9.13 | 2.60 | 9.0 min. |
| Avg. Varnish | 5.39 | 4.52 | 5.0 min. |
| Piston Skirt Varnish | 7.02 | 6.8 | 6.5 min. |
| Cam Lobe Wear, mils | | | |
| max. | 7.40 | 16.8 | 15 max. |
| avg. | 1.61 | 0.5 | 5 max. |

[1] Both VI improvers were blended in 5W-30 grade SF motor oil.

What is claimed is:

1. A lubricant additive composition prepared by the steps comprising:
    A) reacting a polymer prepared from ethylene and at least one $C_3$-$C_{10}$ alpha-monoolefin and optionally a polyene selected from non-conjugated dienes and trienes comprising from about 15 to 80 mole percent of ethylene, from about 20 to 85 mole percent of said $C_3$-$C_{10}$ alpha-monoolefin and from about 0 to 15 mole percent of said polyene and having a number average molecular weight ranging from about 25,000 to 500,000 with at least one olefinic carboxylic acid acylating material to form one or more acylating reaction intermediates characterized by having a carboxylic acid acylating function within their structure, and
    B) reacting said reaction intermediate in (A) with an aminoaromatic compound selected from the group consisting of aminopyridines, aminopyrazines and aminopyrimidines represented by the following formulas:

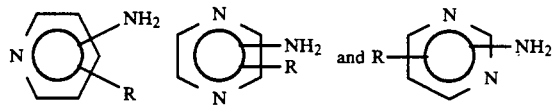

in which R is hydrogen or an alkyl or alkoxyl radical having from 1 to 18 carbon atoms.

2. A composition according to claim 1, in which said polymer has a number average molecular weight from about 50,000 to 150,000.

3. A composition according to claim 1 in which said polymer comprises from about 25 to 80 mole percent ethylene and from about 20 to 75 mole percent of a $C_3$ to $C_8$ alpha-monoolefin.

4. A composition according to claim 1 in which said polymer comprises from about 25 to 55 mole percent ethylene and from about 45 to 75 mole percent of propylene.

5. A composition according to claim 3 which contains from about 0.1 to 10 mole percent of a polyene.

6. A composition according to claim 1 in which said olefinic carboxylic acid acylating agent is maleic anhydride.

7. A composition according to claim 1 in which said olefinic carboxylic acid acylating agent is itaconic anhydride.

8. A composition according to claim 1 in which said aminoaromatic compound is 2-aminopyridine.

9. A composition according to claim 8 in which said aminoaromatic compound is 4-aminopyridine.

10. A compound according to claim 1 in which said amino aromatic compound is aminopyrimidine.

11. A concentrate for a lubricating oil comprising a diluent oil of lubricant viscosity and from about 1 to 50 weight percent of the additive composition of claim 1 based on the total weight of the concentrate.

12. A lubricating oil composition comprising a major amount of an oil of lubricating viscosity and a minor amount effective to impart viscosity index and dispersancy of a lubricant additive composition prepared by the steps comprising:
A) reacting a polymer prepared from ethylene and at least one C$_3$-C$_{10}$ alpha-monoolefin and optionally a polyene selected from non-conjugated dienes and trienes comprising from about 15 to 80 mole percent ethylene, about 20 to 85 mole percent of said C$_3$-C$_{20}$ alpha-monoolefin and from about 0 to 15 mole percent of said polyene, and having a number average molecular weight ranging from about 25,000 to 500,000 with at least one olefinic carboxylic acid acylating material to form one or more acylating reaction intermediates characterized by having a carboxylic acid acylating function within their structure and
B) reacting said reaction intermediate in (A) with an aminopyridines and aminopyrazines and aminopyrimidines represented by the following formulas:

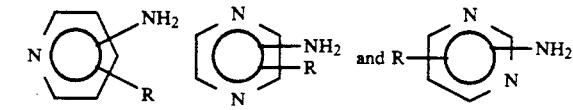

in which R is hydrogen or an alkyl radical having from 1 to 18 carbon atoms.

13. A lubricating oil composition according to claim 12 containing from about 0.1 to 10 weight percent of said additive based on the total weight of the oil composition.

14. A lubricating oil composition according to claim 10 containing from about 1 to 7.5 weight percent of said additive based on the total weight of the oil composition.

15. A lubricating oil composition according to claim 12 in which said polymer comprises from about 25 to 75 mole percent ethylene and from about 25 to 75 mole percent of a C$_3$ to C$_8$ alpha-monoolefin and has a number average molecular weight ranging from about 25,000 to 250,000.

16. A lubricating oil composition according to claim 12 in which said aminoaromatic compound is 2-aminopyridine.

17. A lubricating oil composition according to claim 12 in which said aminoaromatic compound is 4-aminopyridine.

* * * * *